Figures 1, 2:
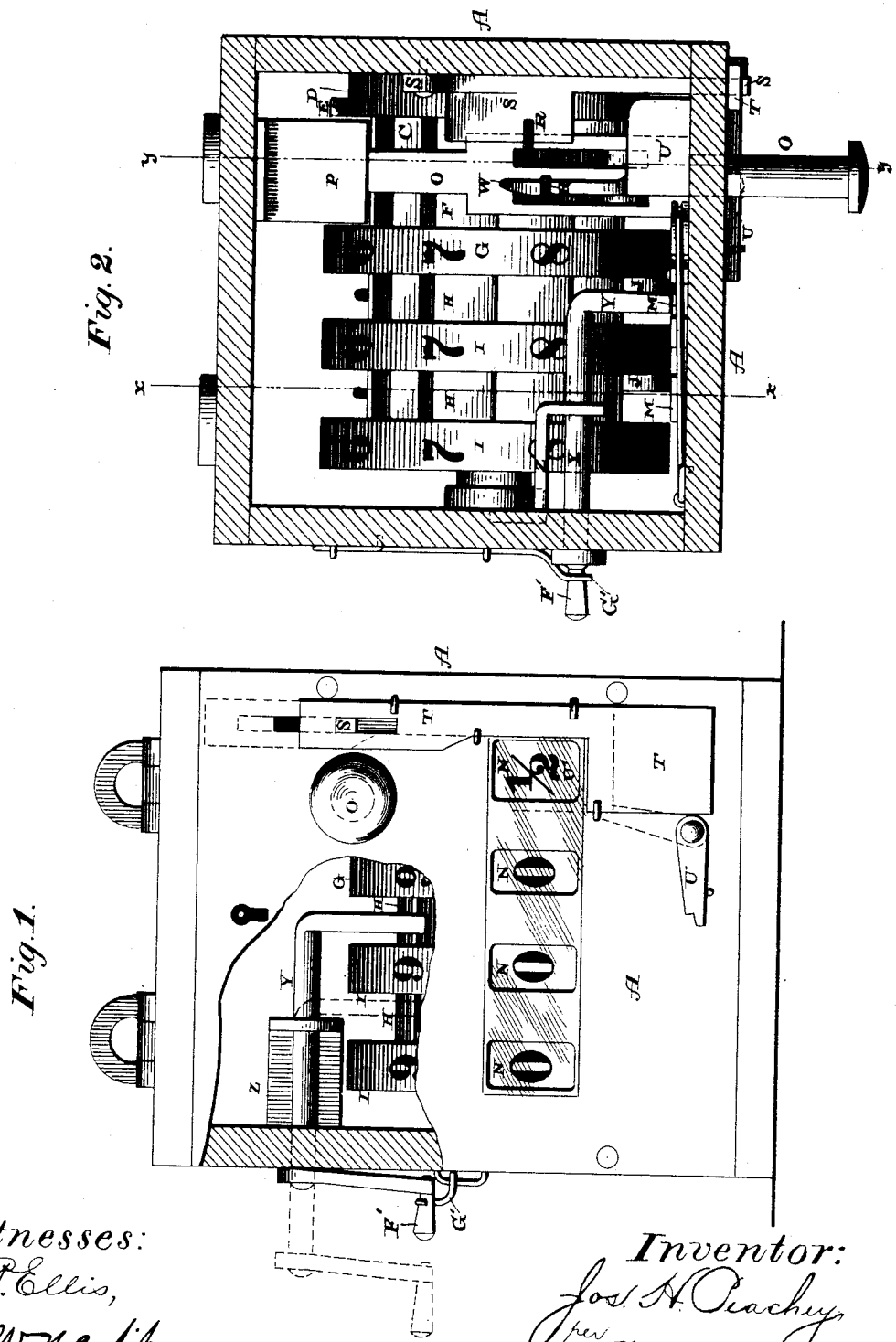

(No Model.)  3 Sheets—Sheet 1.

J. H. PEACHEY.
GRAIN REGISTER.

No. 446,788. Patented Feb. 17, 1891.

Witnesses:
E. P. Ellis,
J. W. Nesbit

Inventor:
Jos. H. Peachey,
per
Lehmann & Pattison,
Attys (No Model.)  3 Sheets—Sheet 2.
J. H. PEACHEY.
GRAIN REGISTER.
No. 446,788.  Patented Feb. 17, 1891.
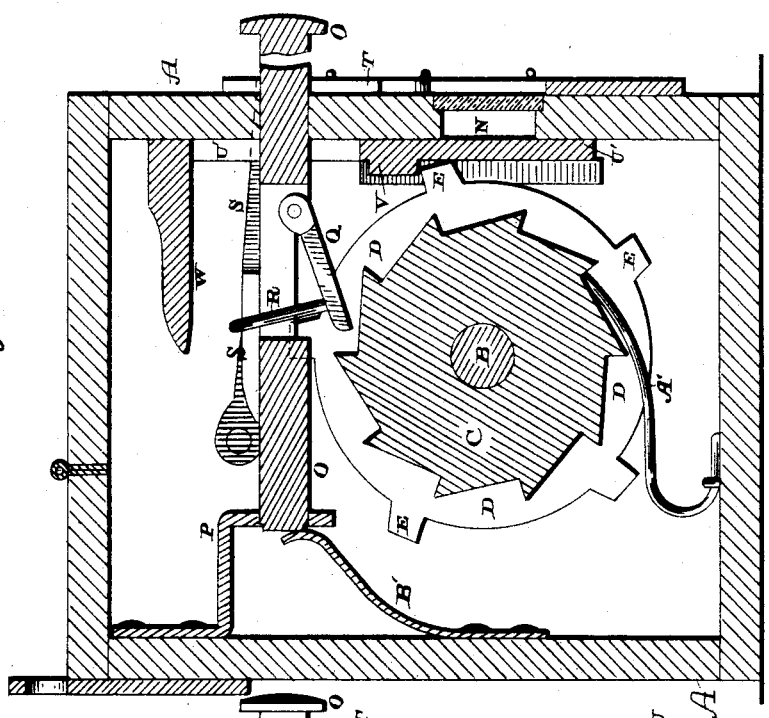
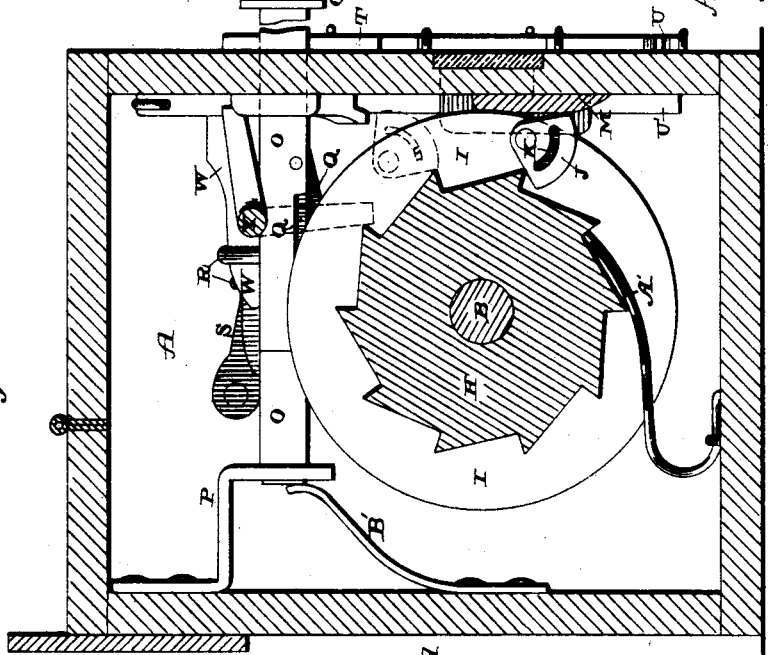
Witnesses:
E. P. Ellis,
J. M. Nesbit
Inventor:
Jos. H. Peachey,
per
Lehmann & Pattison, atty (No Model.) 3 Sheets—Sheet 3.
J. H. PEACHEY.
GRAIN REGISTER.
No. 446,788. Patented Feb. 17, 1891.
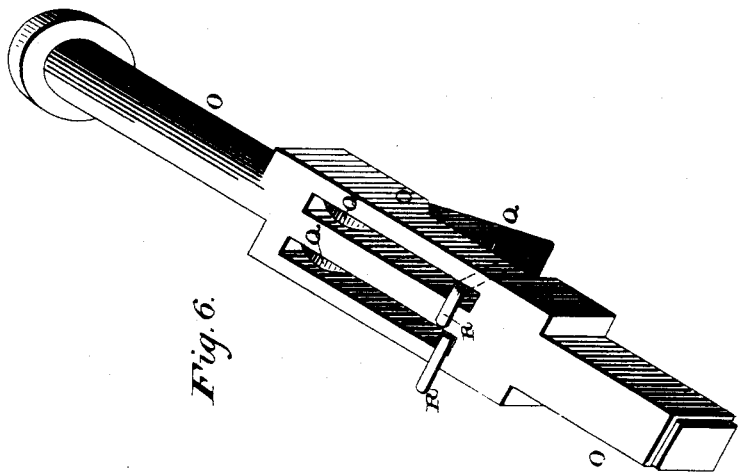
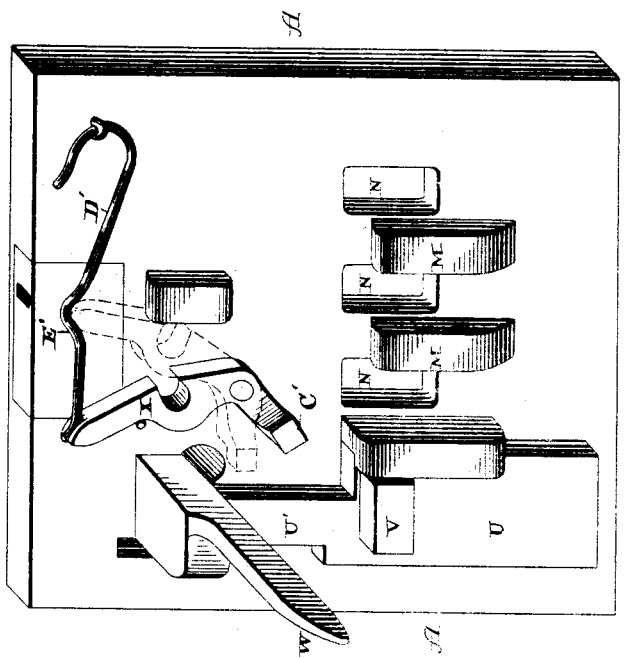
Witnesses:
E. P. Ellis,
J. M. Nesbit
Inventor:
Jos. H. Peachey
per Lehmann & Pattison,
Attys.

UNITED STATES PATENT OFFICE.

JOSEPH H. PEACHEY, OF ALLENSVILLE, PENNSYLVANIA.

GRAIN-REGISTER.

SPECIFICATION forming part of Letters Patent No. 446,788, dated February 17, 1891.

Application filed August 4, 1890. Serial No. 360,981. (No model.)

*To all whom it may concern:*

Be it known that I, JOSEPH H. PEACHEY, of Allensville, in the county of Mifflin and State of Pennsylvania, have invented certain new and useful Improvements in Grain-Registers; and I do hereby declare the following to be a full, clear, and exact description of the invention, such as will enable others skilled in the art to which it pertains to make and use it, reference being had to the accompanying drawings, which form a part of this specification.

My invention relates to an improvement in grain-registers; and it consists, first, in the construction and arrangement of parts, which will be fully described hereinafter; second, in the combination of the ratchet-wheels provided with flanges upon which the numbers are placed, and pivoted slotted pawls placed upon the sides of the flanges and made to engage with the next adjoining ratchet-wheels, and stops for preventing the pawls from turning upon their pivots and causing them to operate the ratchet-wheels with which they engage;
third, the combination of the ratchet-wheels and the crank-shaft for turning them, all of which will be more fully described hereinafter.

The object of my invention is to produce a register which is intended more especially for keeping the tally of grain-measures, and which will register both whole and one-half bushels together in a single count.

Figure 1 is a side elevation of a register which embodies my invention complete, shown partly in section. Fig. 2 is a plan view of the register. Fig. 3 is a vertical section taken on the dotted line X X, Fig. 1, and Fig. 4 is a similar view taken on the line Y Y, Fig. 1. Fig. 5 is a perspective view of the front of the casing, taken from the inner side and showing the different parts connected thereto in position. Fig. 6 is a detached view of the push-rod.

A represents the casing, which may be of any suitable construction, and which is provided with a hinged top, which can be locked so as to prevent the mechanism from being tampered with, and which casing is adapted to be hung up in any position desired. Extending horizontally through this casing is a stationary rod B, upon which the different ratchet-wheels are placed and around which the wheels revolve. Upon this rod B there are placed any desired number of ratchet-wheels, according to the number that is to be registered. As here shown, there are only three of the ratchet-wheels carrying numbers; but it is evident that the number of these wheels can be varied indefinitely. At the right-hand end of the casing there is placed upon the rod B the ratchet-wheel C, which is made in a single piece, with the wheel D of larger diameter, and which is provided with the projections E for operating the vertically-moving rod U, which shows the number of half-bushels. Adjacent to this ratchet-wheel C is a second ratchet-wheel F, which is provided with a flange G of greater diameter, and upon the periphery of which are placed numbers from 0 to 9, and which indicate the units. Side by side with the ratchet-wheel F are placed two or more ratchet-wheels H, which are provided with flanges I, and upon which numbers from 0 to 9 are also placed. Each of these ratchet-wheels is prevented from turning backward upon the rod B by means of spring-catches A', placed in the bottom of the casing A, and whose upper ends engage with the ratchet, as shown.

Pivoted to the flanges G I are triangular-shaped slotted pawls J, which engage with the two ratchet-wheels H for the purpose of turning them upon the rod B. Through the circular slots in these pawls project stops K, which limit the distance that the pawls shall turn upon their pivots. As each flange G I is revolved with its corresponding ratchet-wheel these pawls J are carried around and being free to turn upon their pivots the full length of the slots they are moved outward by the teeth of the ratchet-wheel with which they engage as long as they are free to do so, and thus do not operate the ratchet-wheels until they come in contact with the stops M on the inside of the front of the frame or casing A. These stops M consist of blocks secured rigidly to the front of the casing and are tapered or beveled at their lower ends, where the pawls first come in contact with them, as the pawls are carried around by the flanges G I. When one of the pawls J strikes against its stop M the inner point or corner of the pawl is forced inward, so as to engage with one of the teeth of the ratchet-wheel H, with which it operates, and thus turns the wheel H forward one tooth and brings a new figure into view through the small windows N, made through the front of the casing A, and which are covered with glass or mica. As long as the pawl J is in contact with the stop M it is held in contact with the tooth of the wheel H, with which it operates; but as soon as the pawl passes beyond the stop M it is left free to turn upon its pivot, and then it is forced outward by the teeth of the adjacent ratchet-wheel as far as the stop will permit. Being free to turn upon its pivot, the wheel and flange to which it is connected can then sweep around without operating the adjoining ratchet-wheel until the pawl again comes in contact with the stop M. There being only three registering-wheels here shown, but two pawls are used.

Extending horizontally through the front of the frame or casing is a push-rod O, which has its rear end supported by a suitable guide P, through which it moves and which rod O is returned to position by means of a spring B′, which bears against its inner end for that purpose. The outer end of this rod projects any suitable distance beyond the front side of the frame A and is to be forced inward by hand or any other means each time a half or whole bushel is measured. Pivoted to this push-rod O and projecting downward at their inner ends from the under side of the rod are the two dogs Q, one of which engages with the ratchet-wheel C and the other with the adjacent ratchet-wheel F. Each of these dogs has a rod or handle R projecting from its upper side through a slot in the push-rod O, and which rods or handles R are bent or turned at a suitable angle at their upper ends.

The dog Q, which engages with the wheel C, normally operates the wheel each time that the rod O is forced inward; but if it is desired to register whole instead of half bushels, the lever S, pivoted inside of the frame and provided with a beveled flange to catch under the handle R of the dog Q, which engages with the wheel C, is raised at its outer end by means of the slide T, placed upon the outer side of the front of the casing A. The flange upon the lever S catches under the upper bent end of the dog Q and raises it out of contact with the wheel C, so as to prevent the wheel C from being turned. The outer end of this lever S projects through the slot in the front of the casing and a slot in the upper end of the slide T, so that when the slide is raised the outer end of the lever is also raised, and thus holds the dog out of operation. The slide is held in a raised position by the pivoted support U.

As soon as it is desired to register half-bushels it is only necessary to depress the slide T, when the flange of the lever S will no longer hold the dog out of an operative position.

The dog Q, which operates the ratchet-wheel F, is intended to operate the wheel only at every other time that the push-rod is forced inward when the half-bushels are being registered. In order to prevent the wheel F from being operated by its dog every time that the push-rod O is forced inward, a vertically-moving rod or slide U′ is used, and which has "½" marked upon its outer side, and which is provided with a shoulder V upon its inner side and an arm W at its upper end. This rod or slide U′ is placed in direct contact with the inner surface of the front side of the casing A, and is raised by the projections E upon the wheel or flange D, which turns with the ratchet-wheel C. After one of the projections E catches under the shoulder V it raises the rod or slide U′, so as to bring the figure ½ in front of one of the windows or openings N, and holds the slide in a raised position until the projection E has passed beyond the shoulder V, when the slide drops of its own weight. After the slide has dropped it remains in this position until another projection has been brought into place, and while in this depressed position its arm W rests upon the top of the push-rod O for the purpose of catching under the rod or handle R, connected to the dog Q, which operates the ratchet F. As the push-rod is forced outward by its spring and the handle or rod of the dog which operates the ratchet F rises slightly as the dog moves backward over one of the teeth of the wheel F, the beveled inner end of the arm W catches under the handle and raises the dog, so that it cannot operate the wheel F as the push-rod is forced inward. As this operation of raising the dog out of contact with the wheel F takes place at every other inward motion of the push-rod when the half-bushels are being registered, it will be seen that the wheel F is operated only once for every two movements of the ratchet-wheel C, which indicates the half-bushels. When a half-bushel has been measured, the slide U′ is raised so as to exhibit ½, and this ½ remains exposed until a full bushel is measured, when the slide U drops so as to conceal the ½. When the wheel F has registered 9, its pawl J is made to operate the next adjoining wheel H, and when this wheel H has made a full revolution it likewise moves the adjoining ratchet wheel.

Pivoted to the inner side of the front of the casing is a locking-lever X, which is provided at its lower end with a projection C′, which engages a shoulder upon the said push-rod O and prevents it from being operated when the lever X is in the position shown in solid lines in Fig. 5. A spring D′ is secured at one end to the inner side of the casing and has its opposite free end engage the lever X and hold it in its adjusted position. When the said lever is turned in the position shown in dotted lines, the projection C' is out of engagement with the push-rod O and it can be freely operated. The lever is held in this secured position by its upper end engaging a bend E' in the spring D'.

When it is desired to set the wheels back to any desired starting-point, the wheel F is operated by the push-rod until it brings the figure 8 into view. Then the crank-rod Y, which projects through the side of the casing A and which is provided with a handle F' at its outer end, is forced inward and made to engage with the middle wheel H. By turning this crank-rod its inner end is made to engage with the ratchets on the first wheel H and the wheel is turned until the figure 8 appears. The crank-shaft is then drawn endwise through the side of the frame until its end is moved against the support Z, and then the shaft is again revolved, so as to cause the second wheel H to turn until the figure 9 appears. The crank-shaft is then forced inward again and given a partial turn, so as to turn the first wheel H, so that the figure 9 appears. The crank-shaft is then locked in position by means of the spring G' on the end of the box, and which is provided for the purpose of preventing the crank-shaft from having any movement. Then operate the push-rod until the wheel F stands at 0, when all three wheels will stand at 0. Care must be taken in the first instance to always have the register show ½, and then the slide T is raised, so as to cause the lever S to prevent the wheel C from being moved. Before beginning to operate the push-rod and cause the flange G to present 0, the slide T must be dropped, so as to cause the wheel C to operate.

Having thus described my invention, I claim—

1. In a register, the combination, with two ratchet-wheels, of a reciprocating push-rod having two pawls which engage the said wheels, rods secured at one end to the pawls and having their opposite ends bent laterally, and a vertically-moving rod which engages the upper bent end of the said rods for the purpose of disengaging them from the wheels, substantially as set forth.

2. The combination of the two ratchet-wheels C F, placed side by side, the wheel C being provided with a flange D, having projections E, with a push-rod, two dogs loosely connected to the rod for operating the ratchet-wheels C F, with a vertically-moving slide which is operated by the projections E on the flange D, and which is provided with an arm W at its upper end for raising one of the dogs out of contact with the wheel F at every other movement of the push-rod, substantially as specified.

3. The combination of two ratchet-wheels C F, the flange D, provided with projections E, the partially-moving slide U, provided with a shoulder V and the arm W, the push-rod provided with two pivoted dogs having rods or handles connected to them, and a lever S, substantially as shown.

4. In a register, the combination of a series of ratchet-wheels side by side, and a revolving and endwise moving rod which extends across and outside of the peripheries of the wheels, the said rod having its inner end bent laterally, whereby its inner end can be placed opposite either wheel and made to engage the teeth thereof, when revolved, for the purpose of setting the machine, substantially as described.

In testimony whereof I affix my signature in presence of two witnesses.

JOSEPH H. PEACHEY.

Witnesses:
S. D. COLDREN,
JAMES A. ARMSTRONG.